W. R. JONES.
MOTOR PLOW.
APPLICATION FILED MAR. 29, 1912.
1,123,748.
Patented Jan. 5, 1915.
4 SHEETS—SHEET 3.
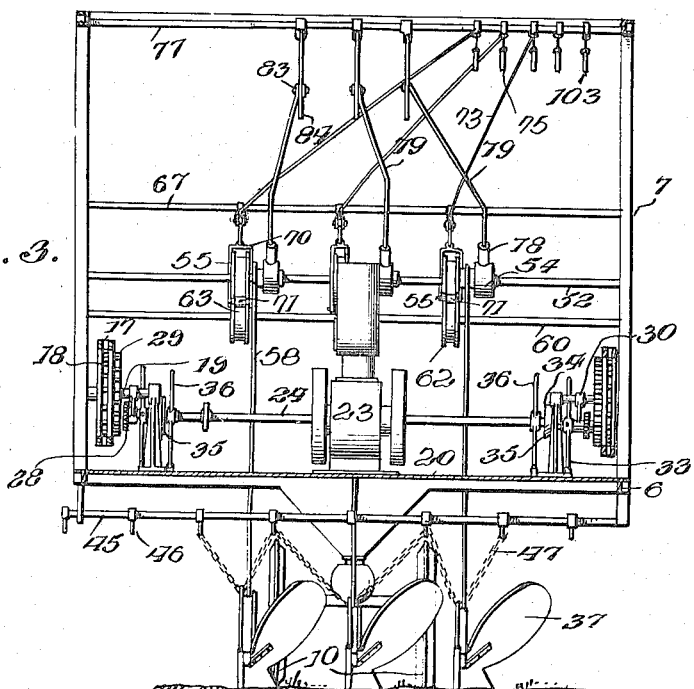
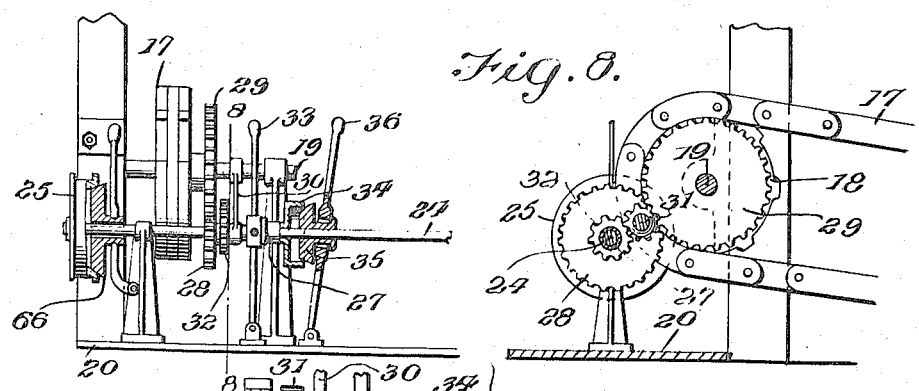
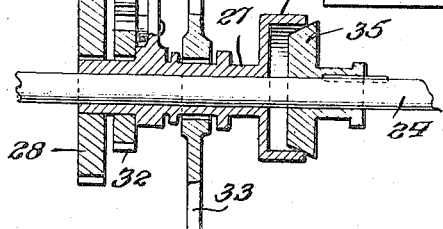
Inventor
W. R. Jones.
Witnesses

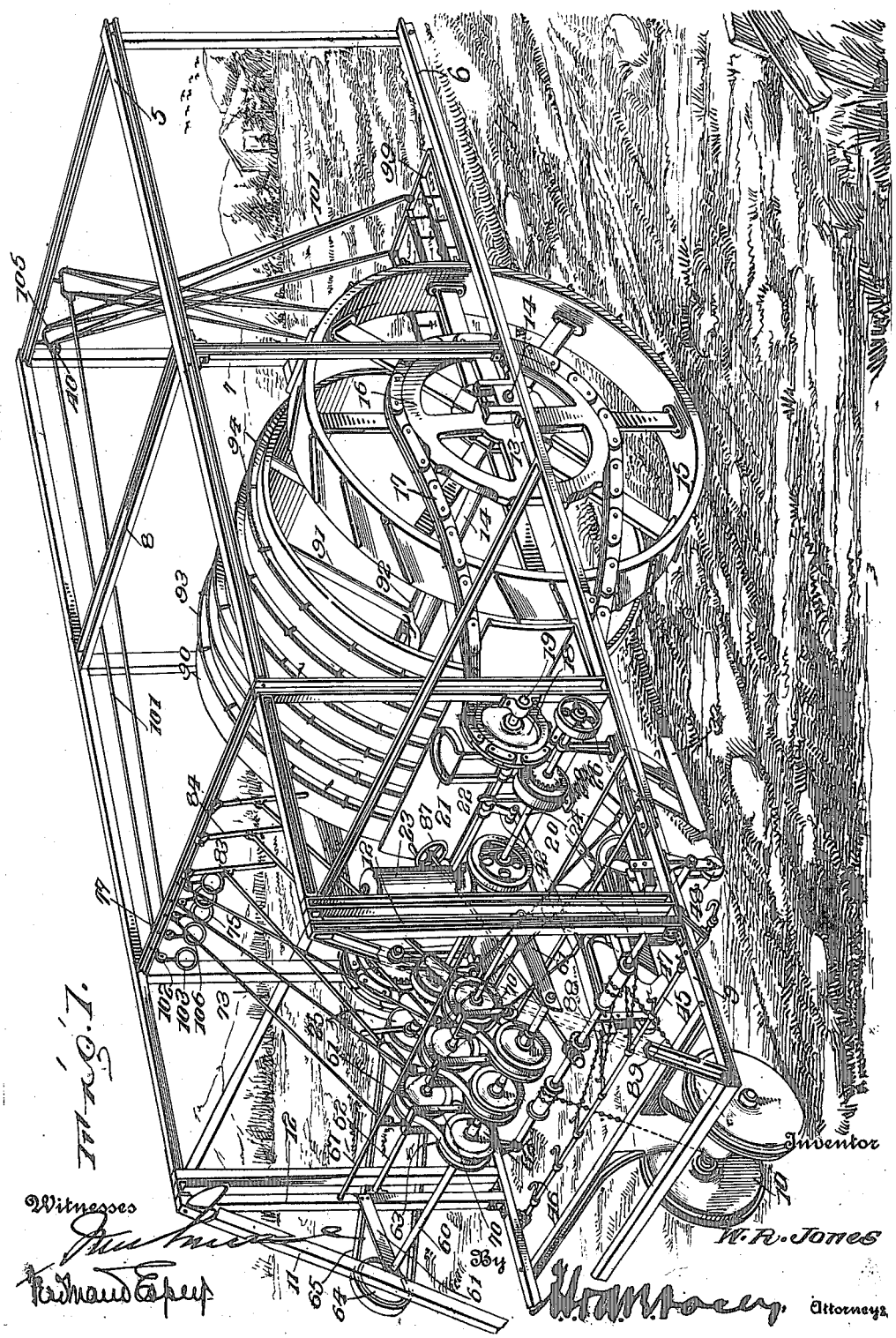

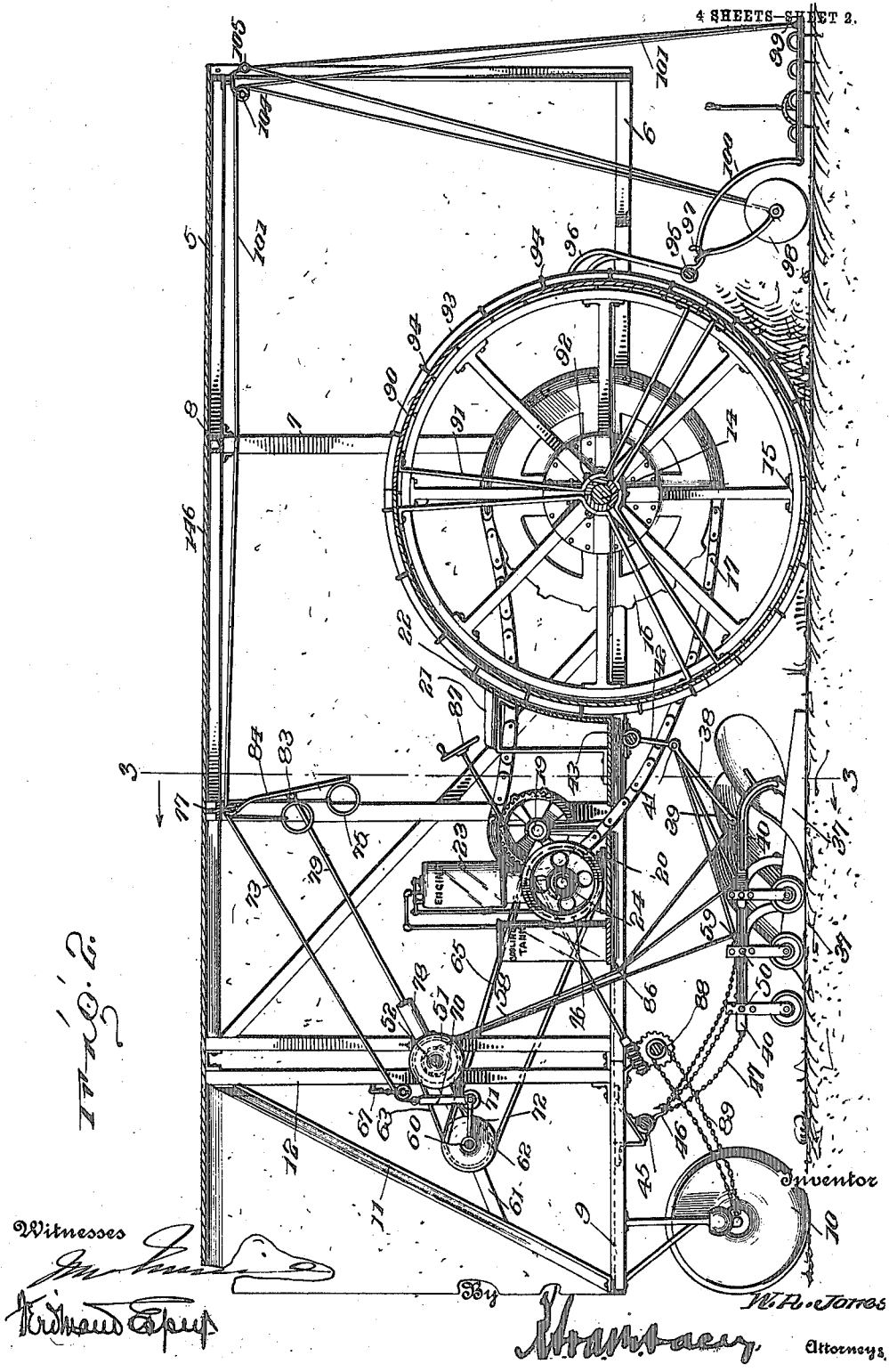

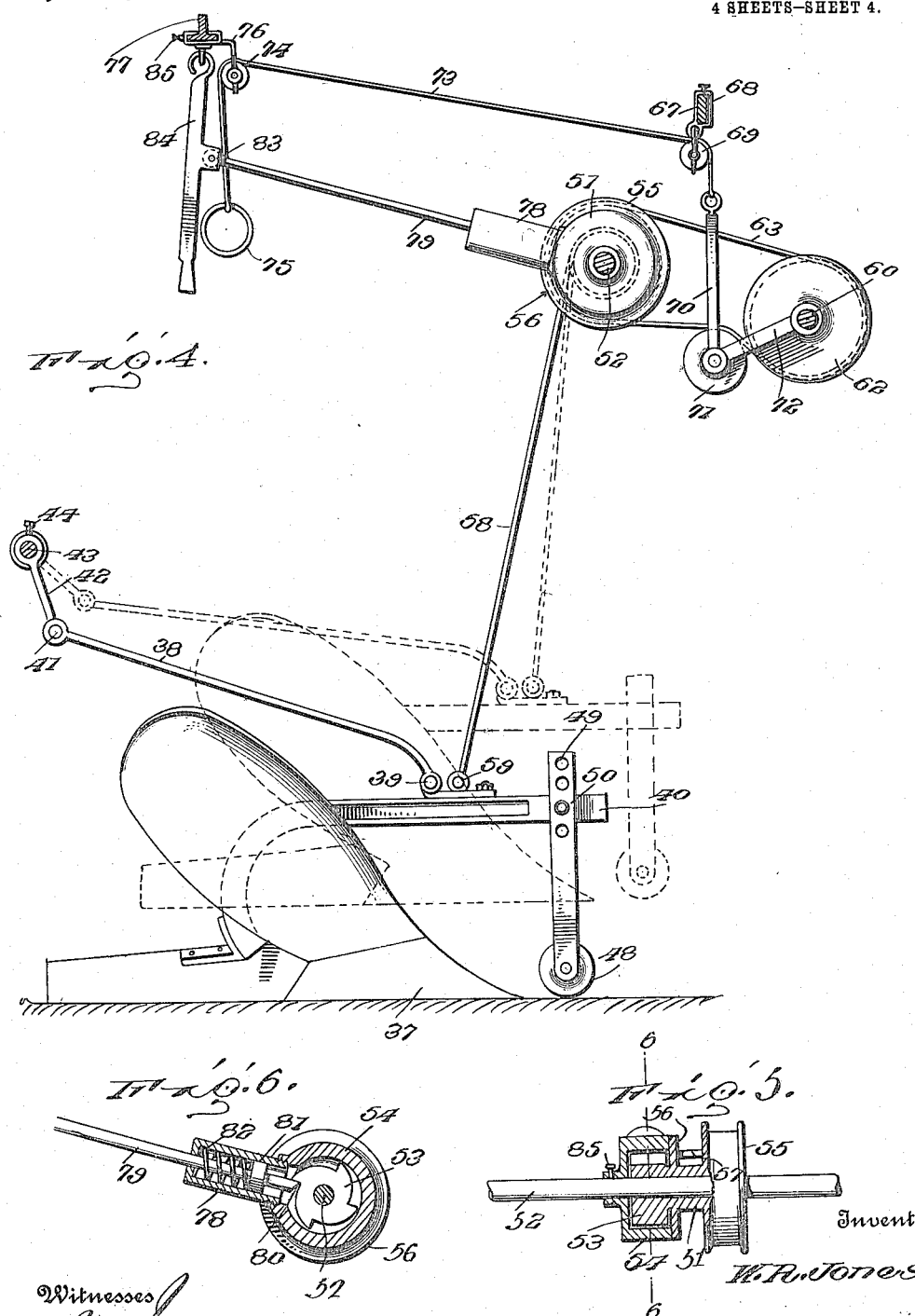

UNITED STATES PATENT OFFICE.

WILLIAM R. JONES, OF MARION, MICHIGAN.

MOTOR-PLOW.

1,123,748.　　　　　　Specification of Letters Patent.　　　　Patented Jan. 5, 1915.

Application filed March 29, 1912. Serial No. 687,192.

*To all whom it may concern:*

Be it known that I, WILLIAM R. JONES, citizen of the United States, residing at Marion, in the county of Osceola and State of Michigan, have invented certain new and useful Improvements in Motor-Plows, of which the following is a specification.

This invention relates to agricultural machinery and more particularly to a motor driven plow especially designed for use in rough or hilly country for tilling the soil preparatory to planting.

One object is to provide a gang of plows, each having one end thereof pivotally mounted on the supporting frame or truck and its other end operatively connected with a suitable draft bar, said plows being movable independently of each other so as to conform to any surface irregularities in the soil over which the machine is traveling.

A further object is to provide novel means for successively elevating the plows, means for supporting the plows in elevated position, and means for regulating the depth of penetration of the plows into the soil.

A still further object is to improve this class of devices so as to increase their utility, durability and efficiency.

Further objects and advantages will appear in the following description, it being understood that various changes in form, proportions and minor details of construction may be resorted to within the scope of the appended claims.

For a full understanding of the invention and the merits thereof, reference is to be had to the following description and accompanying drawings, in which:

Figure 1 is a perspective view of a motor driven plow constructed in accordance with my invention, the cover being removed in order to more clearly show the construction of the operating mechanism; Fig. 2 is a longitudinal sectional view, showing the cover in position on the machine; Fig. 3 is a vertical sectional view taken on the line 3—3 of Fig. 2 and looking in the direction of the arrow; Fig. 4 is a side elevation, partly in section, of one of the plows together with its raising and lowering mechanism, the plow being shown in full lines in lowered position and in dotted lines in elevated position; Fig. 5 is a side elevation, partly in section, of one of the drums employed for raising and lowering the plows; Fig. 6 is a transverse sectional view taken on the line 6—6 of Fig. 5; Fig. 7 is a front elevation, partly in section, of the gearing employed for propelling the machine either in a forward or backward direction; Fig. 8 is a vertical sectional view taken on the line 8—8 of Fig. 7 and looking in the direction of the arrow; Fig. 9 is a longitudinal sectional view of the driving shaft and its associated parts shown in Fig. 7.

Corresponding and like parts are referred to in the following description and indicated in all the views of the drawings by the same reference characters.

The motor driven plow forming the subject matter of the present invention comprises a supporting frame or truck including upper and lower side bars 5 and 6, preferably formed of angle iron, connected by spaced uprights 7 to which are bolted or otherwise rigidly secured spaced transverse bars 8. The supporting frame or truck is provided with a detachable extension 9 on which are pivotally mounted the steering wheels 10, said extension being provided with rearwardly inclined braces 11 having their upper ends connected to uprights 12, similar in construction to the uprights 7, the extension forming a continuation of the main frame of the truck when in use.

Journaled in suitable bearings 13 on the lower side bars of the truck, is a rear axle 14 carrying spaced traction wheels 15. Each traction wheel 15 is provided with a sprocket wheel 16 over which extends a sprocket chain 17 leading to a relatively small sprocket wheel 18 mounted on a stub shaft 19. Resting on the lower side bars of the truck, is a platform 20 having a seat 21 secured thereto and provided with an upwardly and rearwardly extending plate 22 which forms a guard for the traction wheels 15, as best shown in Fig. 1 of the drawings.

Mounted on the platform 20, is an engine or other suitable motor 23, the driving shaft 24 of which extends transversely of the truck and is provided with terminal pulleys 25 and 26. Slidably mounted on each end of the driving shaft 24, is a sleeve 27 having a gear wheel 28 secured thereto which meshes with a similar gear wheel 29 secured to the adjacent stub shaft 19 so that when the driving shaft 24 is rotated, motion will be transmitted through the gearing to the traction wheels to drive the machine in a forward direction. Each sleeve 27 is provided with a connecting bar 30 which encircles the adjacent stub shaft 19 and on which is mounted a pinion 31, which latter meshes with a pinion 32 carried by the sleeve so that by operating the shipper lever 33 the gear wheel 28 may be moved out of engagement with the wheel 29 and the pinion 31 moved into mesh therewith so as to cause the machine to travel in a rearward direction, when desired. One end of each sleeve 27 terminates in a clutch member 34 for engagement with a corresponding clutch member 35, the latter being secured to and movable with a lever 36, by operating which, motion may be transmitted from the engine to the traction wheels or the shaft 24 allowed to rotate without affecting the machine. Thus it will be seen that by manipulating the levers 33 and 36, the machine may be caused to travel either in a forward or rearward direction or the engine allowed to run without affecting the truck.

Arranged directly beneath the platform 20, is a gang of plows 37, the individual plows being preferably disposed one slightly in advance of another and each provided with a rearwardly extending arm 38, the lower end of which is pivotally mounted at 39 on the adjacent plow beam 40, while the upper end thereof is pivotally connected at 41 to a relatively short link 42 suspended from a bar or rod 43 extending transversely of the truck frame in advance of the traction wheels, as best shown in Fig. 2 of the drawings. The connecting links 42 are pivotally mounted on the rod or bar 43 and are adjustable laterally thereon so as to permit the plows 37 to be centered with respect to the truck frame or moved laterally to either side thereof as the case may be, said links being supported in adjusted position by means of screws or other clamping devices, indicated at 44.

Secured to the extension 9 of the truck frame, is a transverse draft bar 45 to which are secured a plurality of spaced hooks 46. each hook receiving a draft chain 47 leading to the adjacent plow beam, as shown. It will here be noted that by reason of the pivotal connections 39, 41 and 42, the plows are free to move forwardly and upwardly so as to conform to any irregularities in the surface soil over which the machine is traveling. It will also be noted that the plows are movable independently of each other so that should one of the plows strike an obstruction in the path of movement of the truck, the other plows will not be affected. Moreover, this manner of suspending or hanging the plows from the truck frame permits the plows to pass over hilly or rolling ground and produce an even furrow of uniform depth, regardless of the surface contour of the soil.

Depending from each plow beam 40, is a caster wheel 48, the shank of which is provided with a plurality of openings 49 adapted to receive a pin or similar fastening device 50 so that by placing said pin 50 in the different openings 49, the depth of penetration of the plow point into the soil may be regulated at will.

As a means for successively raising and lowering the plows so as to leave the ends of the furrows in transverse alinement at the opposite ends or sides of a field, or when transporting the truck from one place to another, there are provided a plurality of winding drums 51 mounted for rotation on a stationary shaft 52, each drum being provided at one end thereof with a ratchet head 53, which operates in a casing 54, and at its other end with a pulley 55. Connecting the guard flanges 56 of each winding drum, is a pin 57 to which is secured the adjacent end of a cord, chain or other flexible medium 58, the other end of said cord or chain being fastened to an eye 59 secured to the upper longitudinal edge of the adjacent plow beam at a point slightly in advance of the pivot 39, as best shown in Fig. 4 of the drawings.

The stationary shaft 52 is rigidly secured to the uprights 12 of the truck extension, and disposed in a plane slightly below and in advance of the stationary shaft 52 is a rotating shaft 60, the latter being journaled in suitable brackets 61 also carried by the truck extension 9. Keyed or otherwise rigidly secured to the rotating shaft 60, are a plurality of wheels or pulleys 62 over which extend endless belts 63 leading to and encircling the adjacent pulleys 55 on the stationary shaft 52. Secured to one end of the shaft 60, is a belt pulley 64 over which extends a belt 65 leading to the belt pulley 25 on the driving shaft 24, so that when the shaft 24 is rotated, motion will be transmitted through the medium of the belt 65 to the pulleys 62 and thence through the belts 63 to the pulleys 55, thereby to wind the cords 58 on the drums 51 and effect the raising of the plows. A clutch 66 is also preferably mounted on the platform to permit the belt pulley 25 to be thrown into and out of operation at will.

Arranged above and at a point between the shafts 52 and 60, is a transverse bar 67 having a plurality of clips 68 adjustable longitudinally thereof and from which are suspended suitable sheaves or pulleys 69. Suspended from each pulley 69, is a yoke or hanger 70 having an idle pulley 71 journaled therein for engagement with the adjacent belt 63, said yoke or hanger being provided with arms 72 which encircle the shaft 60 on opposite sides of the adjacent pulley 62 so as to permit the idle pulley 71 to be moved into and out of engagement with the belt 63. Extending over the sheaves or pulleys 69, are cords or chains 73, one end of each of which is attached to the suspension eye of the adjacent yoke 70, while the other end thereof extends over a sheave or pulley 74 and is provided with a terminal finger ring 75. The sheaves or pulleys 74 are carried by brackets 76, which brackets are in turn mounted on and adjustable longitudinally of a bar 77 connecting the upper sills 5 of the truck frame. Thus, it will be seen that by exerting a downward pull on any one of the finger rings 75, the idle pulley 71 will be moved into engagement with the adjacent belt 63 so as to tighten the belt and thus cause motion to be transmitted from the rotating shaft 60 to the adjacent drum to effect the raising of the plows.

The casing of each winding drum is provided with a tubular extension 78 in which is slidably mounted a locking rod 79, the free end 80 of which is inclined or beveled for engagement with the teeth on the ratchet head 53 so that after the winding drum has been rotated to effect the elevation of the plow, the locking rod 79 will automatically engage the teeth on the ratchet head and thus lock or hold the plow in elevated position. One end of each locking rod is provided with a collar 81 against which bears a coiled spring 82, which spring also bears against the end of the adjacent tubular member 78 and serves to normally and yieldably hold the active or pointed end 80 of the adjacent locking rod in engagement with the teeth on the ratchet head.

The locking rods 79 are pivotally connected at 83 with suitable hand operated levers 84 depending from the bar 77 so that by pressing rearwardly on the free ends of the levers 84, the rods 79 may be disengaged from the ratchet heads 53 so as to permit the plows to return by their own weight to lowered position. As soon as the levers 84 are released, however, the springs 82 will automatically cause the rods to engage the ratchet heads and prevent further rotation of the winding drums. In this manner, the plows may be supported in any desired position of vertical adjustment. It will of course be understood that the inclined or beveled ends of the locking rods 79 are so disposed as to permit winding of the cords or cables on the drums, but will prevent reverse movement of said drums when the locking rods are in engagement with the ratchet heads.

The levers 84, as well as the casings 54, are preferably adjustable transversely of the truck frame and are held in adjusted position by screws or similar fastening devices 85. The finger rings 75 and levers 84 are preferably disposed at a point directly above the operator's seat 21 so that the driver or operator of the machine may conveniently manipulate the various levers and finger rings without the necessity of leaving his seat.

Secured to the forward longitudinal edge of the platform 20, are a plurality of relatively small rollers 86 which bear against the adjacent cords or chains 58 and serve to prevent abrasion or injury thereto when raising and lowering the plows. A steering head 87 is also preferably disposed near the operator's seat 21 and connected with a transverse shaft 88 to which are secured spaced chains 89 leading to the steering wheels 10 so that the truck may be guided in the usual manner.

Interposed between the traction wheels 15, is a cylindrical pulverizing drum or packer, said drum or packer being preferably formed in sections 90 detachably united and each provided with inwardly extending braces 91, the converging ends of which are bolted together to form a boxing 92 adapted to turn on the rear axle of the truck. Each section of the cylindrical drum or packer is provided with a plurality of ribs 93 which serve to crush or pulverize the soil, there being traction lugs 94 formed on the ribs in order to prevent slipping thereof. The sections 90 of the drum or packer are so arranged that they may occupy only a portion of the space between the traction wheels, or may extend from one traction wheel to the other, the end sections fitting over the traction wheels. When only three plows are used in the gang, the sections of the drum or packer will terminate short of one of the traction wheels, as shown in Fig. 1, and thus allow the traction wheel having no packer section secured thereto, to travel on the unplowed ground. This construction also permits the ground to be plowed close to a fence or away from the fence, as desired.

Extending transversely of the truck frame at the rear of the combined packer and pulverizer, is a rod 95 to which are secured a plurality of spaced scraping knives or fenders 96, which latter operate between the pulverizing ribs 93 and serve to prevent dirt adhering to the packer and thus clogging or otherwise obstructing the same. The rod 95 is also provided with spaced hooks 97 from which are preferably suspended one or more disk harrows, indicated at 98. Arranged at the rear of the disk harrows 98, are drag harrows 99, each provided with a yoke or bail 100 which projects forwardly for attachment to the adjacent hook 97.

As a means for raising and lowering the disk harrow 98, there is provided a suitable operating cord 101, one end of which extends over a pulley 102 and is provided with a finger piece 103, while the other end thereof is provided with an extra strand, which strands pass over a sheave or pulley 104 for attachment to the disk harrow 98, and are thence extended upwardly and fastened over a hook 105. Thus it will be seen that by exerting a downward pull on the finger piece 103, the disk harrow 98 may be raised and lowered, at will. Similar ropes or cables form a connection between the drag harrow 99 and a corresponding finger ring 106, preferably arranged at the front of the truck near the ring 103. Thus it will be seen that as the machine is caused to travel in a forward direction over a field or other inclosure, the plows will turn the soil, while the drum will pulverize and pack the soil and the members 98 and 99 disk and drag the same, thus placing the soil in condition for planting. In starting to plow a field, one of the plows is allowed to enter the soil, while the other two are elevated. As the machine travels in a forward direction, the elevated plows are successively allowed to drop so that they will enter the ground in transverse alinement with the furrow formed by the first mentioned plow, and conversely, at the end of the field, the plows are successively elevated by means of the winding drums, so that the machine leaves all of the furrows in predetermined transverse alinement, as will be readily understood.

When it is desired to use the machine as a grain drill, drag harrows are substituted for the gang plows and the grain drill is supported on the truck frame in rear of the packer and pulverizer which, in this instance, is assembled so as to entirely fill the space between the traction wheels. The grain drill will be operatively connected with the traction wheels by suitable gearing.

By dismantling the machine, that is to say, by removing the ground-treating implements, as well as the raising and lowering mechanism, and setting the front axle and steering wheels back to a position beneath the platform 20, the machine may be used with good results as a traction engine for general farm use.

When the device is used as a traction engine, the pulley 26 may be connected through the medium of a belt with a threshing machine, separator or other machinery for driving the same. The machine is preferably provided with a suitable cover 146 which serves to house and protect the operating mechanism of the machine, as best shown in Fig. 2 of the drawings.

It will of course be understood that any desired number of plows may be mounted on the machine and the relative disposition of the several parts, as well as the size and proportions thereof may be varied at will, without departing from the spirit of the invention.

From the foregoing description, it is thought that the construction and operation of the device will be readily understood by those skilled in the art and further description thereof is deemed unnecessary.

Having thus described the invention, what is claimed as new is:

1. An agricultural machine including a wheeled truck, a rod extending transversely of the truck, a link pivotally mounted on the rod, a plow, an arm having its upper end pivoted to the lower end of said link and its lower end pivoted to the plow, means operatively connected with the plow adjacent said arm and extending forwardly therefrom for raising and lowering the latter, and means for supporting the plow in different positions of vertical adjustment.

2. An agricultural machine including a wheeled truck, a rod extending transversely of the truck, a transverse draft bar arranged in front of the rod, a link pivotally mounted on the rod, a plow, an arm pivoted at its lower end to the plow and at its upper end to the lower end of the link, a flexible draft element connecting the draft bar and plow beam, means operatively connected with the plow for raising and lowering the latter, and means for holding the plow in elevated position.

3. An agricultural machine including a wheeled truck, a rod extending transversely of the truck, a link pivotally mounted on the rod, a plow having a beam disposed longitudinally of the truck, an arm pivoted at its upper end to the lower end of the link and at its lower end to the said beam, a vertically adjustable caster wheel depending from the front end of the plow beam, a transverse draft bar on the truck, a flexible draft device connecting the front end of the plow beam and the draft bar, and means attached to the plow adjacent said arm for elevating the plow.

In testimony whereof I affix my signature in presence of two witnesses.

WILLIAM R. JONES. [L. S.]

Witnesses:
 F. B. DUMHAM,
 C. F. CHAPIN.